United States Patent [19]

Specht

[11] 3,915,275

[45] Oct. 28, 1975

[54] SET OF CONSTRUCTIONAL ELEMENTS FOR MAKING CONVEYOR DEVICES

[75] Inventor: Dieter Specht, Dhunn, Germany

[73] Assignee: MASYC AG, Laufen, Switzerland

[22] Filed: July 30, 1974

[21] Appl. No.: 493,179

[30] Foreign Application Priority Data

Aug. 27, 1973 Germany............................ 2343104

[52] U.S. Cl................................ 193/35 R; 193/37
[51] Int. Cl.² ........................................ B65G 39/02
[58] Field of Search.............. 193/35 R, 37; 308/20; 198/127 R; 29/110, 116

[56] References Cited

UNITED STATES PATENTS

| 1,241,324 | 9/1917 | Alvey | 308/20 |
| 1,772,577 | 8/1930 | Knap | 308/20 |
| 2,593,089 | 4/1952 | Barry | 193/35 R |
| 2,964,154 | 12/1960 | Erickson | 193/35 R |
| 3,343,204 | 9/1967 | Ford | 193/37 X |
| 3,353,644 | 11/1967 | McNash | 193/37 |
| 3,540,561 | 11/1970 | Becker | 193/35 R |
| 3,721,326 | 3/1973 | Bussienne | 193/35 R |
| 3,751,122 | 8/1973 | Dubay | 193/35 R X |
| 3,763,980 | 10/1973 | Stein | 193/35 R |

FOREIGN PATENTS OR APPLICATIONS

| 1,144,544 | 10/1957 | France | 193/37 |
| 631,559 | 11/1961 | Canada | 193/37 |
| 1,340,317 | 9/1963 | France | 193/37 |
| 1,241,091 | 7/1971 | United Kingdom | 198/127 R |

Primary Examiner—Evon C. Blunk
Assistant Examiner—James L. Rowland
Attorney, Agent, or Firm—Heilman, Heilman & Casella

[57] ABSTRACT

A set of constructional elements which may be combined to define conveyor devices, such as roller trains, continuously running shelves, band conveyors, etc. includes elongated, generally U-shaped support frames having slit and T-shaped recesses therein, and cooperating fittings adapted to be inserted into said slits and capable of supporting the roller elements. The constructional elements may be assembled in varied configurations to define the desired conveyor device.

8 Claims, 13 Drawing Figures

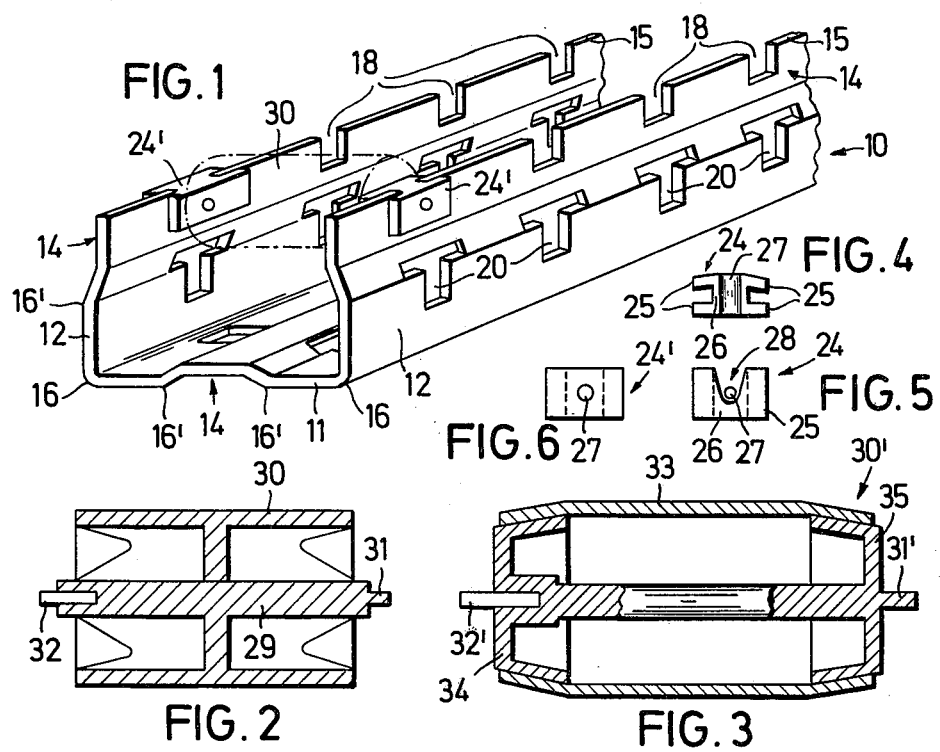
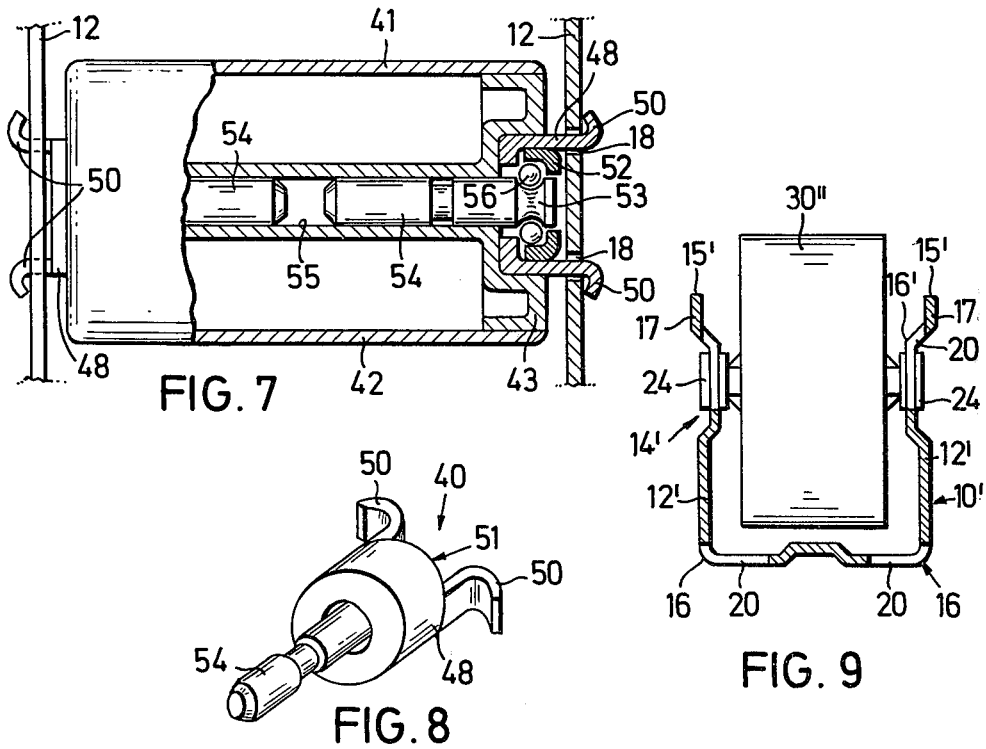

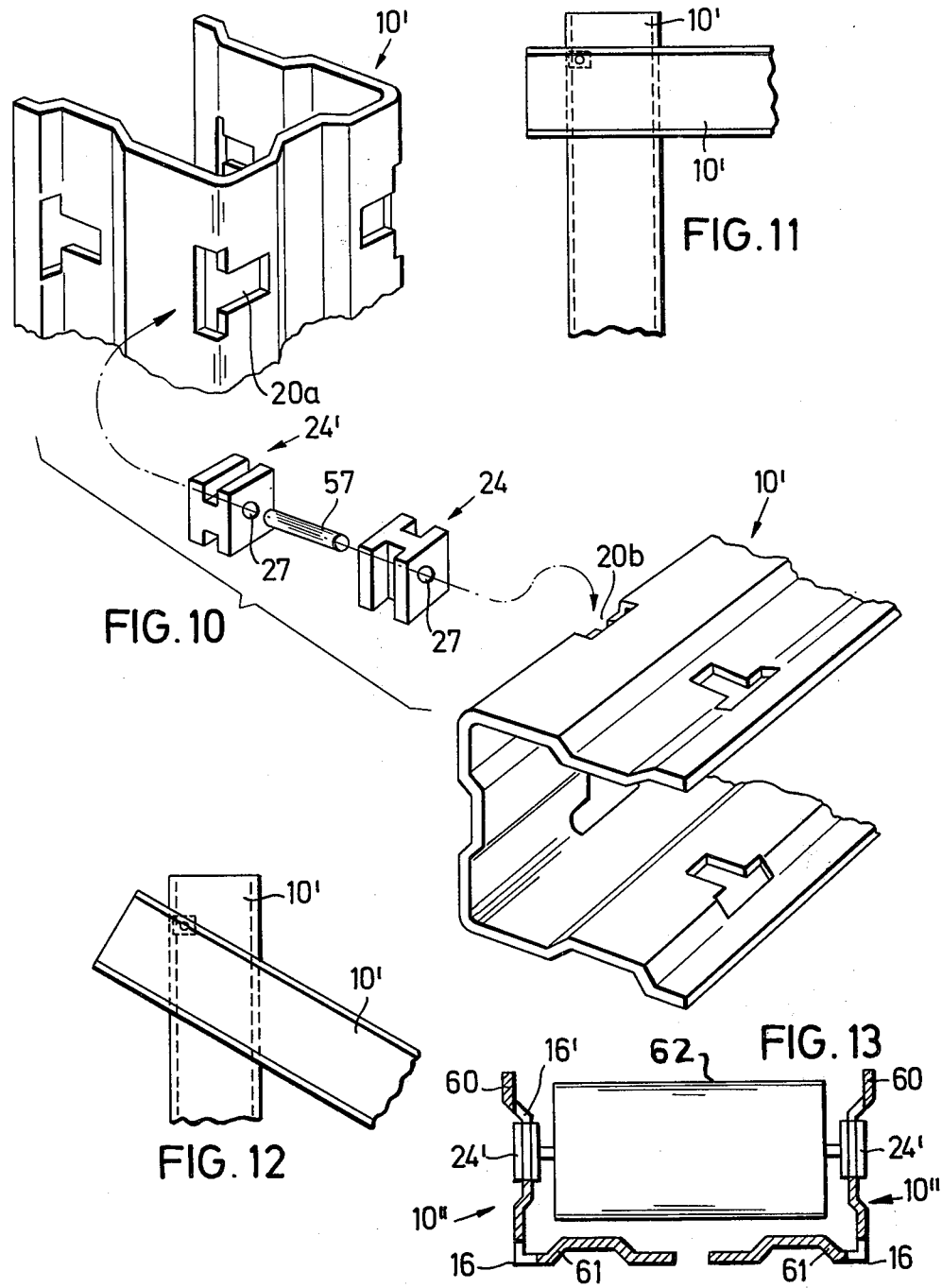

SET OF CONSTRUCTIONAL ELEMENTS FOR MAKING CONVEYOR DEVICES

The invention relates to a set of constructional elements for the making of conveyor devices, such as large and small gravity roller conveyors, continuous run shelves, band conveyors, etc.

The object of the invention is to provide a set of constructional elements for the production of such conveyor devices, which set of constructional elements consists of a few inexpensively produceable individual elements which may be combined in a particularly great multiplicity of forms to supply conveyor devices of the widest variety and for the greatest diversity of uses. In this connection the individual elements may be assembled together by trained personnel without difficulty to supply the particular desired conveyor device, and there exists at all times the possibility of substituting individual elements or of reconstructing the entire device. In spite of their simple and inexpensive design the conveyor devices made with the set of constructional elements according to the invention are robust and have a long life.

For the attainment of this object the set of constructional elements according to the invention is characterized in open hollow support frames with slit recesses arranged at regular intervals on the free sides, and/or T-shaped slit recesses on the internally lying corner edges of the hollow support frames, and in fittings which can be inserted into the slit recesses and the T-shaped slit recesses for the assembly of spindles, rollers and rolls, and for the fixing of the hollow support frames together.

The invention thus provides a set of constructional elements consisting of support frames, few, simple fittings and rollers and the like, whereby these parts can be assembled in an extraordinarily great multiplicity of alternatives, as will be perceived for example from the following description, in such a manner that it is possible to make the most varied conveyor devices quickly and simply from a store of supplies which contains only few individual elements, and also dismantle these conveyor devices and reconstruct them anew in another way. The multiplicity of the arrangement possibilities may be further enlarged in a further execution of the invention in that, by means of the arrangement of elements introduced into the flanges and straps of the hollow support frames, additional internally lying corner edges are formed with T slit recesses. These incorporated elements also contribute at the same time to the stiffening of the hollow support frames.

A fitting made preferably of synthetic plastic material has an H-shaped cross-section, with the cross-member filling the slit recesses, and with the ends of the H-strap engaging over the edges of the slit recesses, and a perforation extending centrally through the H-strap and the cross-member. These fittings may be used on the one hand for the storage of roller axles in the slit recesses, and on the other hand they may serve for fixing two hollow support frames, if two such H-shaped fittings are rotatably joined one against the other by means of a bolt passing through their perforations.

An alternative of the invention provides that the perforation of these H-fittings should be open over a groove on one side of the fitting, so that it may be possible to insert a roller subsequently into the fitting mounted in a slit recess.

In specially preferable manner use is made within the scope of the invention of large and small rollers with solid axle bolts protruding on both sides and fitting in the perforations of the H-shaped fitting.

Another fitting of the constructional elements set according to the invention consists in a roller bearing bush onto which two gripping arms fitting in the slit recesses are shaped and whose internal roller bearing ring bears an axle journal. These fittings are used preferably for the higher loaded rollers, when the roller bearing bush is introduced into a corresponding recess of the bottom of the roller, while the axle journal is pushed into a corresponding tube or a corresponding hole of the roller.

Further features, characteristics and advantages of the invention will become apparent from the following description of a few examples of execution used for the clarification, and in no way for the limitation of the concept of the invention, reference being made to the attached drawings in which:

FIG. 1 is a perspective view of a portion of the hollow support frame of the set of constructional elements according to the invention, in which, for the sake of indication, a small roller mounted in this hollow support frame has been represented;

FIG. 2 is a longitudinal central section through a roller of the set of constructional elements according to the invention;

FIG. 3 is a representation of an alternative roller corresponding to FIG. 2;

FIG. 4 is a top view of an H-shaped fitting;

FIG. 5 is a side view of an H-shaped fitting;

FIG. 6 is a representation of an alternative of an H-shaped fitting corresponding to FIG. 5;

FIG. 7 is a top view, partly in cross-section, of the assembly of a roller according to another form of execution of the fitting;

FIG. 8 is a perspective view of the roller mounting fitting shown in FIG. 7;

FIG. 9 shows in cross-section another form of execution of a hollow support frame with a roller mounted in it;

FIG. 10 is an exploded view of two hollow support frames and of a fitting for securing the hollow support frames together;

FIGS. 11 and 12 illustrate in diagrammatic side views the possibilities of angled assembly of two hollow support frames with the fitting according to FIG. 10; and FIG. 13 shows the assembly of a roller between two angled-hollow support frames in a representation corresponding to FIG. 9.

FIG. 1 shows a hollow profile rod 10 which is substantially U-shaped in cross-section, on the basis of which the invention features of the hollow support frame are to be explained. However, let it be expressly stressed beforehand that the U-cross-section shape for the hollow support frame according to the invention is not essential. This hollow support frame can, as may be seen for example from FIG. 13, have a cross-sectional shape other than the U-shaped or the angled-shaped forms represented.

The hollow support frame 10 consists of a strap 11 and two flanges 12, while slit recesses 18 are formed in the free edge 15 of each flange 12 at regular intervals. These slit recesses 18 have a rectangular shape in the drawing; however, they could also be rounded and even exhibit a certain undercut, i.e. be to some extent constricted on the opening side. Into these slit recesses 18 it is possible to introduce the H-shaped fittings 24, 24' (FIGS. 4–6) to be described.

However, in order to be able to introduce such fittings not only into the free sides 15 of the hollow support frames, the invention provides that in addition T-slit recesses 20 are formed for example on the corner edges 16 between the strap 11 and the flanges 12 (see FIG. 9), with the strap of the T-slit recesses being formed identically with the slit recesses 18, while the cross-flange of these T-slit recesses extends over the corner edge 16 and its width is such that it is possible to introduce the H-fittings 24, 24'.

To extend further the possibilities of variation, that is to say to be able to form T-slit recesses 20 not only on the corner edges 16 between straps and flanges of the hollow support frames, but also inside the straps and flanges, it is possible additionally to form inside said straps 11 and flanges 12 inserted parts 14, so that additional corner edges 16' for the arrangement of T-slit recesses are formed. The inserted parts 14 contribute also to the rigidity of the hollow support frames.

In this connection brief reference will be made to the cross-sectional shape of the hollow support frame 10' according to FIG. 9. As distinct from the hollow support frame 10 according to FIG. 1, the flanges 12' on the other side of the inserted portion 14' are here further provided with an extension 17, the free edge 15' of which has no slit recesses 18, as a result of which it is intended to be demonstrated that the simple, right-angled slit recesses need not be provided on all hollow support frames.

In FIG. 1, 30 denotes a roller which is rotatably mounted with H-fittings 24' in the slit recesses 18. To form a gravity-roller conveyor, such a roller 30 may be fitted in all slit recesses 18, or in every two or every three.

According to the representation in FIG. 2 such a roller 30 consists in a plastic injection molded part with axial core 29, at the end of which either a plastic axle stub 31 formed according to the representation at 31, or an axle stub of plastic or metal is inserted according to the representation at 32.

A first form of execution of the H-shaped fitting 24 is represented in FIGS. 4 and 5. They can be made as plastic injection molding parts and consists in a cross-flange 26 fitting into the slit recesses 18 and in the straps 25 engaging over the edges of the slit recesses 18, while a perforation 27 passes through the fitting, the diameter of the hole corresponding to the diameter of the axle stubs 31, 32. In the form of execution according to FIGS. 4 and 5, the perforation 27 is opened by a groove 28 leading upwards.

In the form of execution of the H-shaped fitting 24' in accordance with FIG. 6 this groove 28 is not present, i.e. the perforation 27 is not open towards the side.

For the mounting of a roller 30 in the slit recesses 18 use is made of the fittings 24'. For this purpose one fitting 24' each is pushed onto the axle stubs 31, 32, and these fittings are then introduced into the slit recesses 18. When it is not possible to push the H-shaped fittings onto the axle stubs 31, 32, before the fittings are introduced into the T-slit recesses 20, use is appropriately made of the fitting 24 according to FIGS. 4 and 5 into which, as a result of the provision of the groove 28, it is possible to introduce the axle stubs 31, 32, if the fittings 24 are already located in their T-slit recesses 20.

As a result of the outstanding sliding friction properties of corresponding plastics there is produced for the axle stubs 31, 32 in the hole 17 an outstandingly durable, maintenance-free, smooth axle bearing.

Naturally, the rollers may be also constructed differently. Thus, for example, FIG. 3 shows a roller 30' with a tube casing 33, in both ends of which roller bottoms 34, 35 have been inserted. These roller bottoms 34, 35 are again provided with either a shaped axle stub 31' or an inserted axle stub 32'.

A rather more expensive, highly-loadable form of execution of a roller bearing fitting with corresponding roller has been represented in FIGS. 7 and 8. This fitting 40 is used for supporting a roller 41 which consists of a tubular roller casing 42 inserted into roller bottoms 43, and these roller bottoms 43 form axially a tubular-shaped base 55. This tubular base 55 may naturally be also replaced by a corresponding perforation in solid roller bodies and the like. The roller bottoms 43 have a central recess 44, which can accommodate with limited play a roller bearing bush 48 of the fitting 40. This roller bearing bush is a cylindrical body with a bottom arranged on one side and centrally bored through, while on the other side two gripping arms 50 are formed which are so dimensioned and arranged as to be able to be inserted in two adjoining slit recesses 18 or T-shaped slit recesses 20. The remaining edge area 51 of the roller bearing bush 48 is rolled inwardly and holds an external roller bearing ring 52 in which balls 56 run circularly on an internal roller bearing ring 53. This inner roller bearing ring 53 is formed at the end of an axle stub 54 which is pushed into the tube 55.

On assembly, two fittings 40 are inserted into the two ends of the roller 41 and then their gripping arms 50 are engaged into two adjoining slit recesses 18, 20 of the hollow support frames 10.

With the set of constructional elements according to the invention it is naturally possible to construct not only roller trains according to the representations in FIGS. 1 and 9, in which the rollers 30, 30" lie inside the hollow support frames, but also to have for example, according to the representation in FIG. 13, a roller 62 supported between two hollow support frames 10", which have the form of angled-rods with wings 60 and 61.

In particular, with the hollow support frames 10, 10', 10" it is possible to assemble the greatest diversity of bearer supports, shelves, etc., with and without bottoms, large and small rollers, etc. Naturally, it is possible to screw these hollow support frames together in standard manner, while a particularly advantageous method of mounting is set out on the basis of FIGS. 10, 11 and 12. Thus, in accordance with the invention, it is possible to form from two H-shaped fittings 24' with one pin 57 a fitting which serves to secure two hollow support frames 10' one with the other. The two fittings 24' are joined together rotatably by means of the pin 57 passed through the perforations 27, when, for example, the ends of the pin 57 are flattened by hammering. Now it is possible to insert the one fitting 24' into a T-shaped slit recess 20a of the one hollow support frame, and the other fitting 24' into a correspondingly lying T-slit recess 20b of the other hollow support frame 10' (naturally also into corresponding slit recesses 18), and the two hollow support frames are joined rotatably together in such a manner that it is possible to arrange them in any angular position relative to one another (see FIGS. 11 and 12). If the hollow support frames are to be arranged together to be solid in rotation, then it is necessary to replace the pin 57 only by a corresponding tightenable screw, or to weld or glue together the two fittings 24'.

What is claimed is:

1. An assembly of constructional elements for making a conveyor device comprising an open hollow, elongated support frame of generally U-shaped cross section having a base and two opposed upstanding free arms, each arm having a plurality of opposed, spaced slit recesses disposed at the longitudinally extended edge thereof, each arm provided with an intermediate longitudinally extending inclined portion, with a second set of opposed spaced, T-shaped slots provided in said arms, the vertical portion of each T-shaped slot being disposed in the upstanding surface of the arm, while the horizontal bar portion of the T-shaped slot is cut into said inclined portion; a plurality of generally H-shaped fittings removably positioned in said slit recesses and said T-shaped slots, said fittings including apertures therein; and a plurality of roller means, each supported by a pair of said H-shaped fittngs disposed in the slit recesses or the T-shaped slots.

2. An assembly of structural elements for making a conveyor device as in claim 1 wherein each H-shaped fitting is made of plastic and includes a cross-member and end straps, with the cross-member filling the slit recesses and with the end straps extending over the edges of the slit recesses, and wherein each H-shaped fitting has a perforation extending centrally through said straps and the cross-member.

3. An assembly of structural elements for making a conveyor device as in claim 2 wherein the aperture is a groove extending from one side of the fitting.

4. An assembly of constructional elements for making a conveyor device as in claim 1 further including large and small rollers each having solid axle pins protruding on both sides thereof and fitting into the respective apertures of the H-shaped fittings.

5. An assembly of constructional elements for making a conveying device as in claim 1 wherein the base of said support frame includes an intermediate longitudinally extending reinforcing rib portion defined by two inclined sections and an intermediate section extending offset and parallel to the base, with the latter being provided with a plurality of spaced T-shaped slots cut into the inclined portions and the end portion of the base for receiving the H-shaped fittings.

6. An assembly of constructional elements for making a conveyor device as in claim 1 further including a second support frame which is rotatably connected to first support frame by means of a pin engaging H-shaped fittings respectively mounted on said first support frame and said second support frame.

7. An assembly of constructional elements for making a conveyor device as in claim 1 further including fittings adapted to engage two adjacent slit recesses, which fittings comprise a roller bearing bushing having two gripping arms adapted to engage the slit recesses, and an internal roller bearing ring for supporting roller means.

8. An assembly of constructional elements for making a conveyor device as in claim 1 wherein said support frame is formed of two elongated angled rods arranged to define the generally U-shaped cross-section of the support frame.

* * * * *